United States Patent [19]
DeMonte et al.

[11] Patent Number: 5,152,575
[45] Date of Patent: Oct. 6, 1992

[54] MANUAL TARP ENCLOSING SYSTEM FOR FLAT BED TRUCKS

[76] Inventors: Walter P. DeMonte; Tim P. DeMonte, both of 4549 Grand Marais Rd. E., Windsor, Ontario, Canada, N8W 1X5

[21] Appl. No.: 792,403

[22] Filed: Nov. 15, 1991

Related U.S. Application Data

[63] Continuation-in-part of Ser. No. 658,952, Feb. 22, 1991, Pat. No. 5,080,422.

[30] Foreign Application Priority Data

Mar. 30, 1990 [CA] Canada .................. 2013531

[51] Int. Cl.⁵ .................................... B62D 25/06
[52] U.S. Cl. .................... 296/105; 296/100; 474/64
[58] Field of Search ........... 296/105, 100; 474/64

[56] References Cited

U.S. PATENT DOCUMENTS

| | | | |
|---|---|---|---|
| 3,298,732 | 1/1967 | Openshaw | 296/105 |
| 3,500,895 | 3/1970 | Silvernail | 296/105 |
| 4,285,539 | 8/1981 | Cole | 296/105 |
| 4,711,484 | 12/1987 | Tuerk | 296/105 |
| 4,801,171 | 1/1989 | Weaver | 296/100 |
| 4,902,064 | 2/1990 | Tuerk et al. | 296/105 |

OTHER PUBLICATIONS

Trailer/Bodybuilders, Apr. 2, 1990, pp. 84, 86.
The Concrete Trader, Mar. 1990.

*Primary Examiner*—Robert R. Song
*Attorney, Agent, or Firm*—Riches, McKenzie & Herbert

[57] ABSTRACT

A manual tarp enclosing system is disclosed for enclosing flat bed trailers which has an elongate track on each side and a plurality of U-shaped bows bridging the bed with one of the legs of the bow received in the track on each side of the bed for movement longitudinally in the track means. A cable positioning system for moving and positioning the bow is provided which comprises a closed loop of cable which extends along one side, across the width and down the other side of the bed as parallel double strands. A first bow is secured to one of the cable strands running parallel each of the tracks whereby on manually pulling on the loop of the cable, the first bow is moved towards the front or rear of the bed. A cover is secured to the first bow and at successive intervals to successive of the bows. On drawing the first bow, the cover extends or collapses in an accordion-like manner.

16 Claims, 15 Drawing Sheets

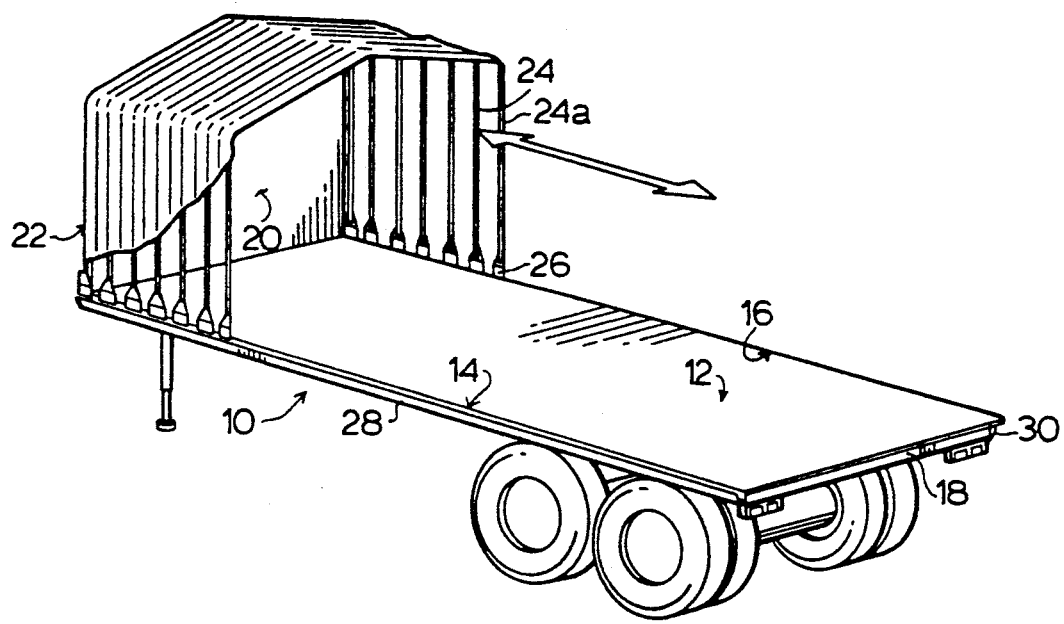
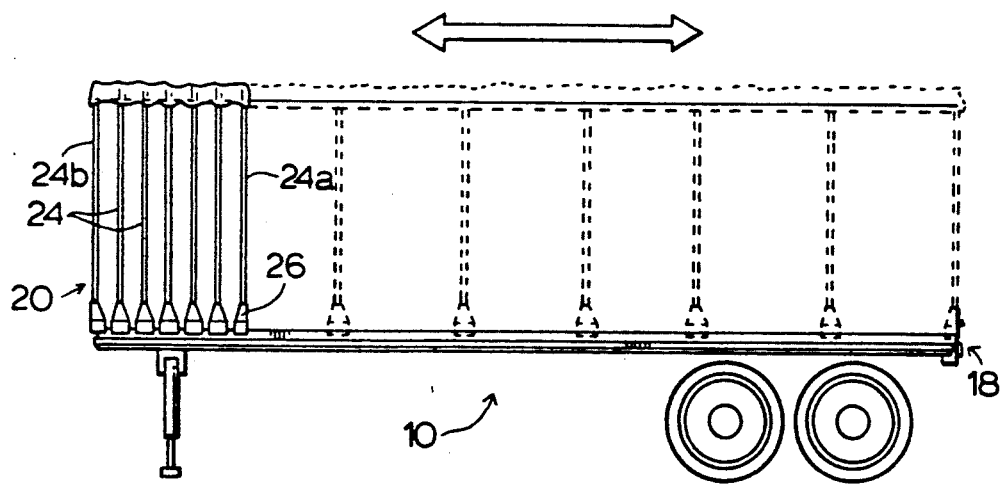

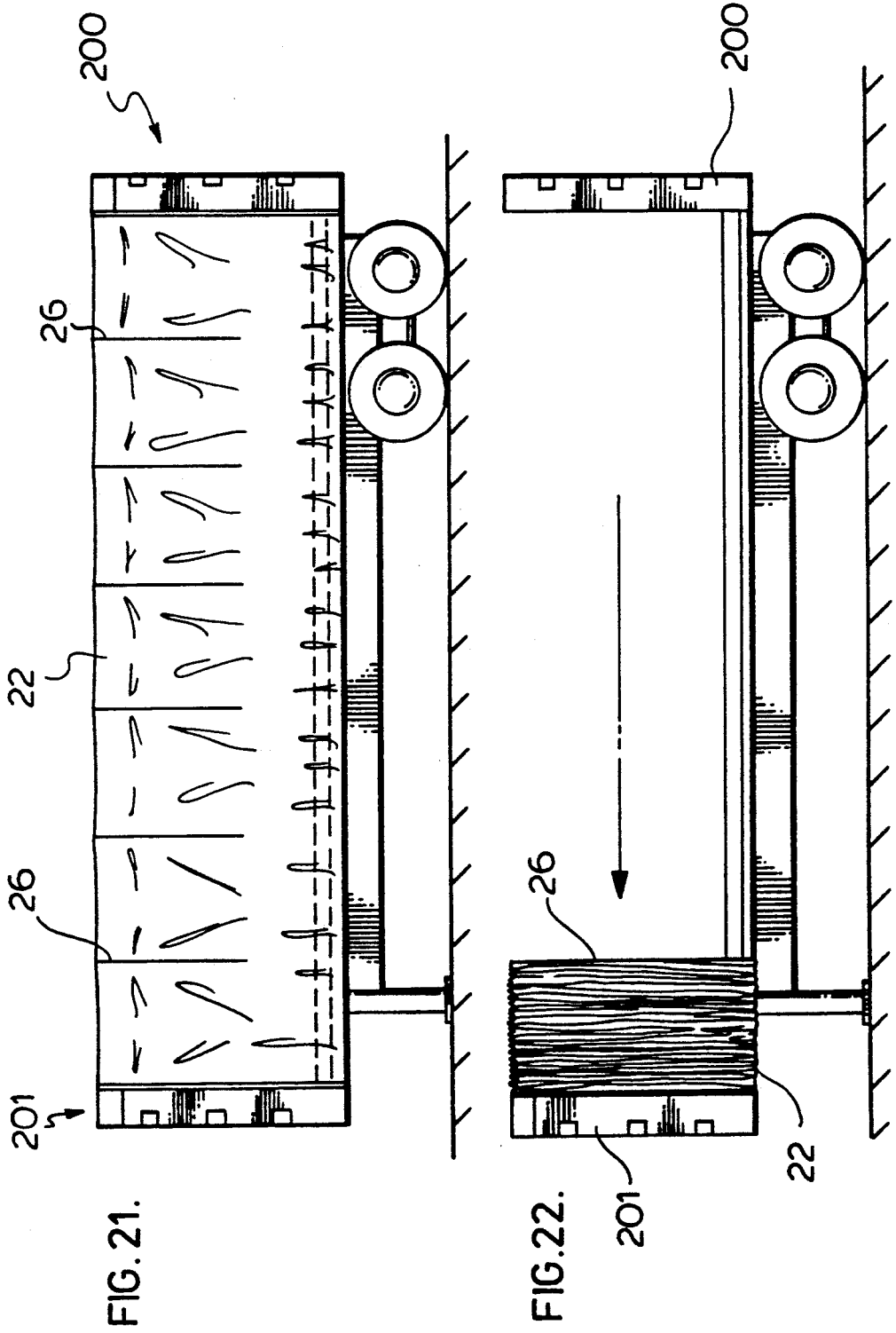

MANUAL TARP ENCLOSING SYSTEM FOR FLAT BED TRUCKS

This invention is a continuation-in-part of copending U.S. patent application Ser. No. 07/658,952 filed Feb. 22, 1991, now U.S. Pat. No. 5,080,422.

SCOPE OF THE INVENTION

This invention relates to a tarp enclosing system and, more particularly, to a manually operated tarp enclosing system for beds of trucks and trailers and the like.

BACKGROUND OF THE INVENTION

Trucks, trailers, rail cars, baggage carts and the like have beds, frequently flat beds, upon which cargo is to be carried.

Frequently, the bed must be open for loading and unloading but needs to be covered otherwise as during transportation and storage to keep rain, snow and dirt from the cargo or to assist in keeping dust, debris and the like of the cargo from escaping.

Many tarp enclosing systems are manually applied and removed. Frequently, this requires extensive climbing up onto the truck bed to implant bows and manually wrestle with heavy tarps to fold or unfold the same and tie them down. Such systems have the disadvantage that they are time consuming and difficult to use. Frequently, elderly or disabled drivers fully capable of driving a transport, are unable, unassisted, to apply and remove known manually operated tarp enclosing systems.

Many tarp enclosing systems suffer the disadvantage that they do not permit easy access to the truck bed other than by removing the tarp.

SUMMARY OF THE INVENTION

To at least partially overcome the disadvantages of known tarp enclosures, the present invention provides a tarp system having bows guided in parallel tracks on each side of the bed, movable manually by a closed loop cable system, and including doors on the rearward most of the bows.

An object of the present invention is to provide a simple tarp enclosing system for flat beds. Another object is to provide a tarp enclosing system in which tarp supporting bows move in tracks along the sides of the bed yet permit easy entry through rear doors.

Accordingly, in one of its aspects, the present invention provides a retractable tarp enclosing system for covering a bed of trucks and trailers and the like comprising:

two elongate track means, one on each side of the bed, a plurality of U-shaped bow means, each having two legs connected by a central bight, and guide means at each end of the legs, each bow means bridging the bed from one track means to the other with guide means retainably received in the track means on each side of the bed for movement longitudinally in the track means, flexible cover means secured at one end to a rearward most one of said bow means and secured to successive bows means at spaced intervals along the cover means, whereby moving rearward most bow along the track collapses or expands the cover means in an accordian-like fashion, the rearward most bow means carrying door means comprising two rigid panels, one hinged to each of the legs of the rearward most bow means for pivoting about a generally vertical axis between a closed portion in which the door means close the end of the bed and an open position in which the doors lie along the sides of the bed so as to not interfere with longitudinal movement of the rearward most bow means in the tracks in collapsing or expanding the cover means.

In another aspect the present invention provides a retractable tarp enclosing system for covering a bed of trucks and trailers and the like comprising:

two elongate track means, one on each side of the bed, a plurality of U-shaped bow means, each having two legs connected by a central bight, and guide means at each end of the legs, each bow means bridging the bed from one track means to the other with guide means retainably received in the track means on each side of the bed for movement longitudinally in the track means, flexible cover means secured at one end to a rearward most one of said bow means and secured to successive bows means at spaced intervals along the cover means, whereby moving rearward most bow along the track collapses or expands the cover means in an accordian-like fashion, a bow-like door support member fixed to the bed to bridge the bed from one side to the other at the rear of the bed rearward of the rearward most bow means, door means carried by the door support member for movement between an open position and a closed position to open and close the end of the bed, means for releasably coupling in substantially weather sealed relation the rearward most bow means to the door support means.

BRIEF DESCRIPTION OF THE DRAWINGS

Further objects and advantages of the present invention will appear from the following description taken together with the accompanying drawings in which:

FIG. 1 is a pictorial view of a first embodiment of a tarp enclosing system in accordance with the present invention on a flat bed trailer with the tarp enclosing system in a collapsed position;

FIG. 2 is a side view of FIG. 1 also showing in dotted lines the tarp enclosing system in an extended position;

FIG. 21 is a schematic side view of the fourth embodiment showing the tarp in a fully covered position;

FIG. 22 shows a configuration of the fourth embodiment in which the rear door supporting bow is fixed to the trailer and the tarp is collapsed;

DETAILED DESCRIPTION OF THE DRAWINGS

Figure 3:
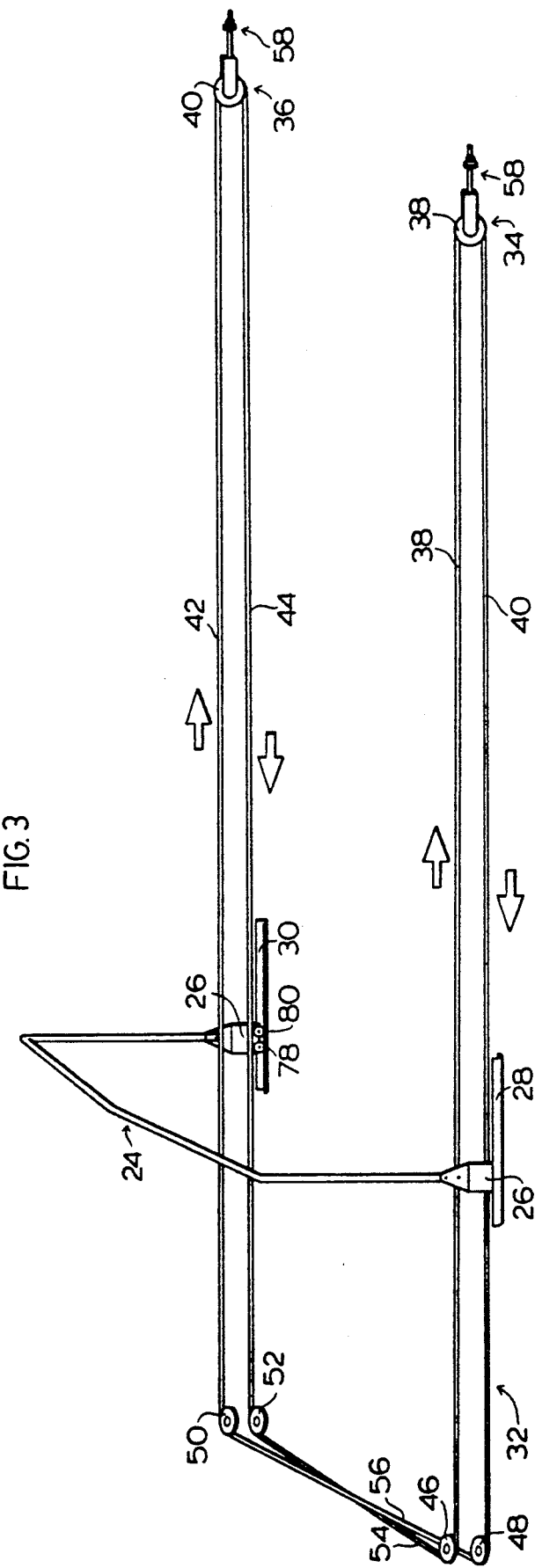
FIG. 3 is a schematic pictorial view of the tracks, bow and cable positioning system of the first embodiment of FIG. 1.
Figure 4:
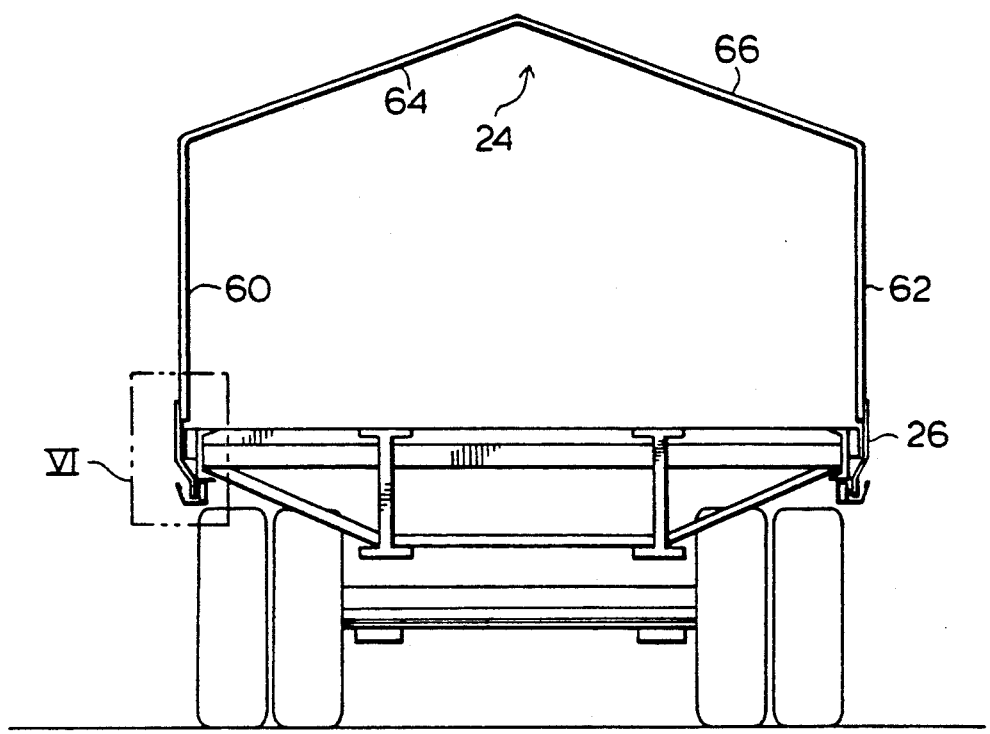
FIG. 4 is a schematic rear view of FIG. 1.

Reference is made to FIG. 1 showing a pictorial view of a flat bed truck trailer 10 in accordance with a preferred embodiment of the present invention. Trailer 10 has a flat bed 12 with sides 14 and 16, a rear 18 and a front 20. In FIG. 1, a retractable, flexible tarp, tarpaulin or cover 22 is shown in a retracted position. Cover 22 is secured at intervals to a plurality of bed bridging bows 24.

Bows 24 have mounting members 26 at each end received in parallel tracks 28 and 30 mounted under each side of the bed so that the bows may be moved forwardly and rearwardly guided by the tracks.

Cover 22 is secured at its rear end to a first bow 24a and at its front end to a last bow 24b which is preferably fixed to the bed. Cover 22 is also secured at spaced intervals to successive of the intermediate bows as by the bows passing through loops in the cover. On moving the first bow 24a rearwardly or forwardly, the cover extends or collapses in an accordian-like manner.

FIG. 3 shows a cable positioning system. The system comprises a closed loop of cable 32 which extends about wheel pulleys located near the corners of the bed. Two loop ends 34 and 36 are engaged about single wheel pulleys 38 and 40 at the rear end of each track 28 and 30. The cable extends forwardly from ends 34 and 36 as two sets of double parallel strands 38, 40, 42 and 44 to pulley wheels 46, 48, 50 and 52 and, hence, across the width of the bed as strands 54 and 56. Pulley wheels 46, 48, 50 and 52 are at the respective rear ends of each track 28 and 30 near the rear corners of bed 12.

Each of the lowermost strands 40 and 44 on each side are securely fastened to first bow 24a. As is to be appreciated, by the crossover of strands 54 and 56, on movement of cable 32 about its loop, both lowermost strands 40 and 44 will move in the same direction at the same speed.

Preferably, pulley wheels 38 and 40 are supported in a sliding manner with tension in the loop being able to be adjusted by threaded tension adjusting nut and bolt assemblies 58 as seen in FIG. 3.

Figure 6:
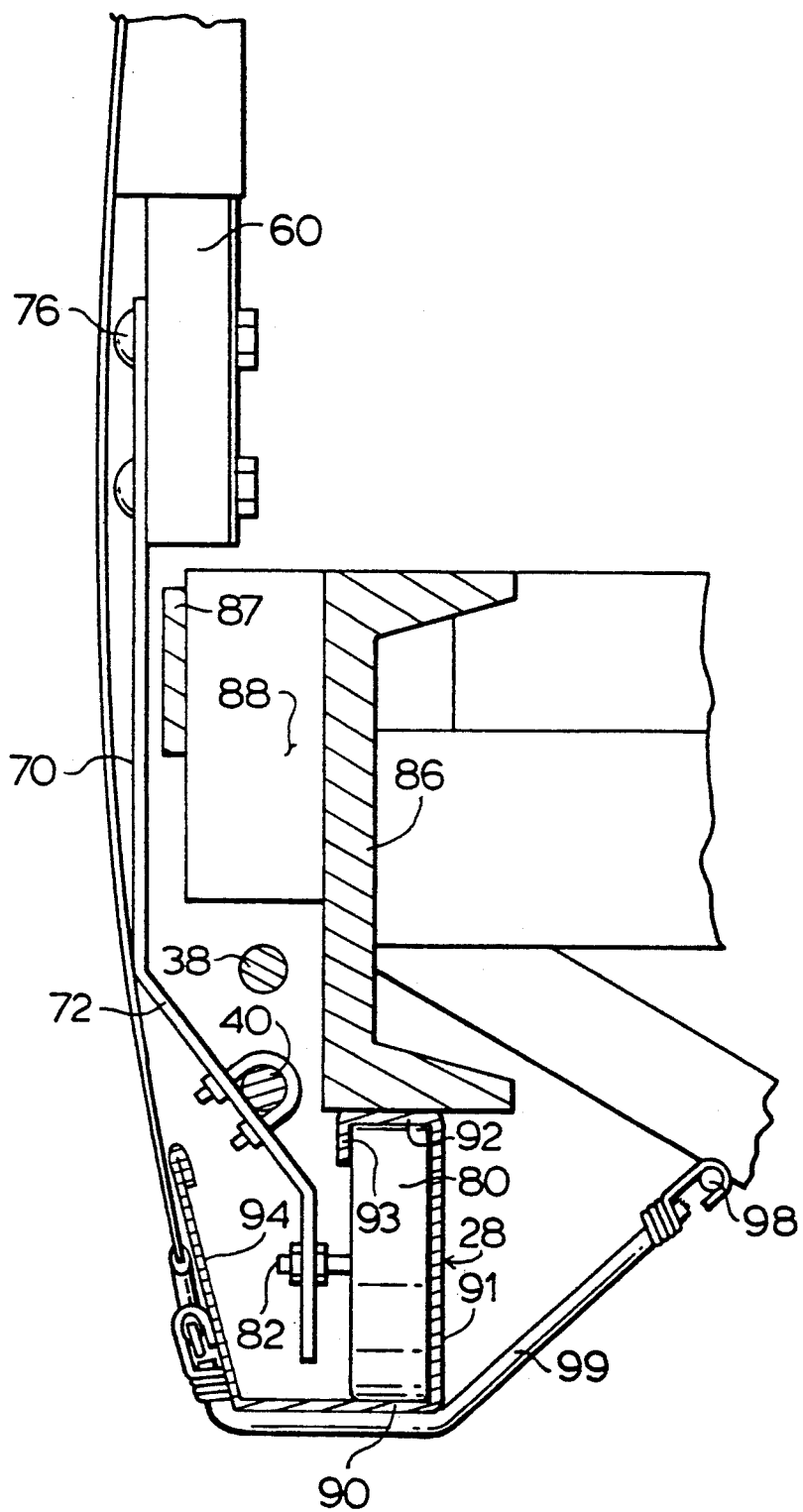
FIG. 6 is an enlarged cross-sectional rear view of the area indicated as VI in FIG. 4.
Figure 7:
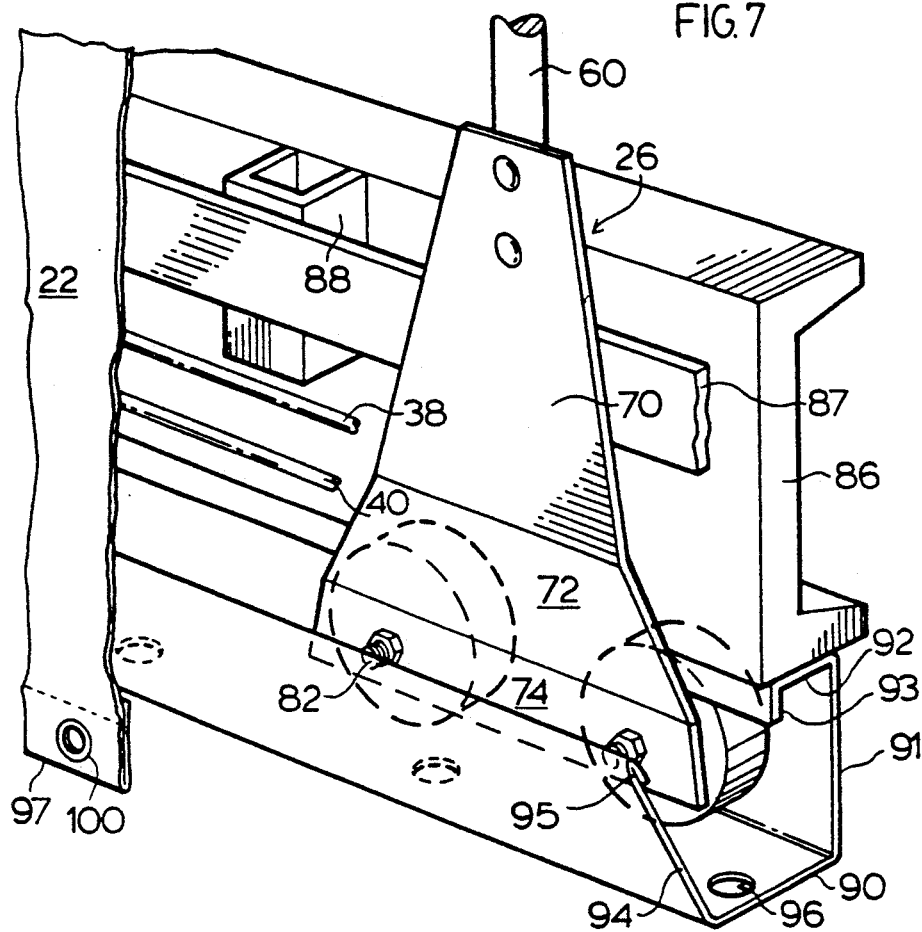
FIG. 7 is a pictorial partial sectional view of the mounting member and track in the first embodiment.

FIGS. 4, 6, 7 and 8 best show the construction of the bows, their mounting means and the tracks. As seen, each bow 24 comprises a rod of tubular metal preferably aluminum, bent to have a generally U-shape with two vertical legs 60 and 62 and central bight joining them formed as two portions 64 and 66 rising to a central apex. To the lower end of each leg, the mounting members generally indicated 26 are secured. The mounting members 26 shown comprise a bracket member of sheet metal of generally triangular shape in side view, widening downwardly from apex at its top. In end view as seen in FIG. 6, the bracket members 26 have an upper vertical portion 70, an intermediate inwardly angling portion 72 and a lower vertical portion 74. Bolts 76 secure the legs 60 of the bow 24 to upper bracket portions 70. Lower vertical portion 74 carries two wheels 78 and 80 journalled on axle forming bolt member 82.

Wheels 78 and 80 are received in track 28 consisting of a generally U-shaped member. Track 28 is shown as having a base portion 90 upon which wheels 78 and 80 run. Inner wall 91 extends vertically upwardly to a top portion 92 secured to a U-beam 86. A retaining wall portion 93 extends downwardly from the outer edge of top portion 92 and serves to constrain wheels 78 and 80 in running alignment, engaged within the track and close to wall 91. An outer wall 94 extends upwardly to an inturned top edge 95.

The track 28 is preferably formed from sheet metal of sufficient thickness to carry the weight of the tarp and bows.

Track 28 has openings 96 in base portion 90 to permit water, dirt, snow and the like to escape. To assist in preventing water, dirt and snow from being caught in track 28, the cover 22 extends down so that its lower side edge 97 overlaps outer wall 94 of track 28 when in use. Preferably, as seen in FIG. 6, a thin rod 98 is welded to the underside of the trailer along its length. Elastic bungie cords 99 with hooks at each end engage between eyelets 100 in cover 22 and rod 98 to draw the sides of cover 22 down and securely into outer wall 94.

The width of the opening between the outer wall 94 and wall portion 93 is preferably sufficiently large to permit a person's hand or a tool such as a scraper to enter track 28 and easily scrape out or remove any accumulated snow, dirt or debris.

As seen in FIG. 6, track 28 is located underneath the truck bed, mounted on the underside of a trailer side channel beam 86 forming a side of the bed. A typical trailer pocket member 88 is provided laterally outside beam 86 with a trailer rub rail 87 attached. Cables strands 38 and 40 extend parallel to track 28 in a space defined under beam 86 and between beam 86 and bracket 28.

A bolted C-clamp is shown for clamping lower cables segment 40 to intermediate portion 72 of bracket 26.

Upper bracket portion 70 is located close to rail 87 so as to minimize the extent to which the width of the bed is increased.

Figure 8:
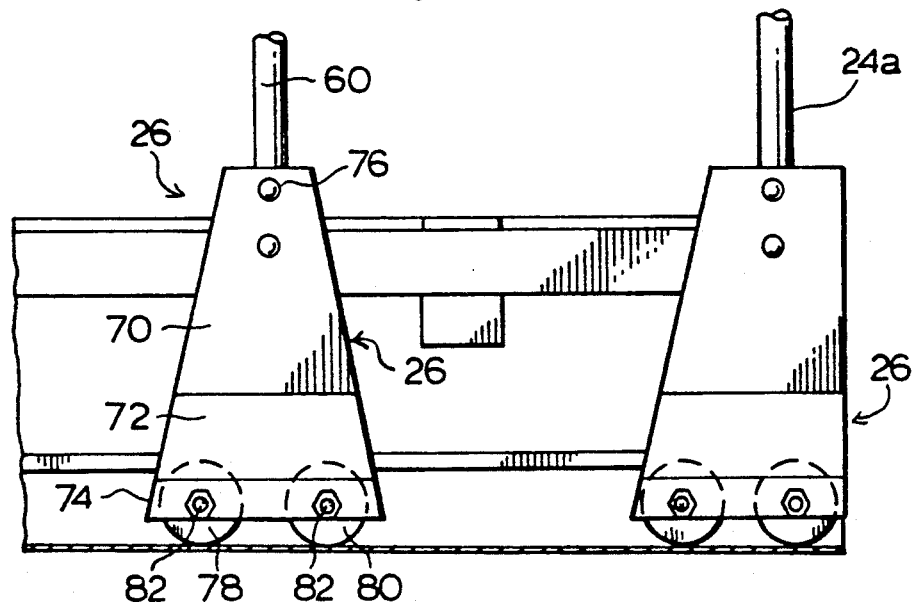
FIG. 8 is a partial side view of the mounting member and track in the first embodiment.

As seen in FIG. 8, wheels 78 and 80 are spaced longitudinally relative to track 28 from each other. This assists in keeping the bows normal to the track on each side and is of assistance in preventing jamming. The spacing of the wheels does increase, however, the extent of the track occupied when the cover is in a fully retracted position.

To manually operate the cover, with bungie cords 99 removed, a person need only manually draw on the forwardmost bow or mounting member 26 on one side of the bed so as to move the mounting member 26 and thereby the cable about its loop and thereby move the first bow 24a towards the fully extended or fully retracted position. While normal manual grasping and drawing is sufficient, if desired, a friction engaging winch whether manually powered or electrically or hydraulically powered can be provided.

Figure 12:
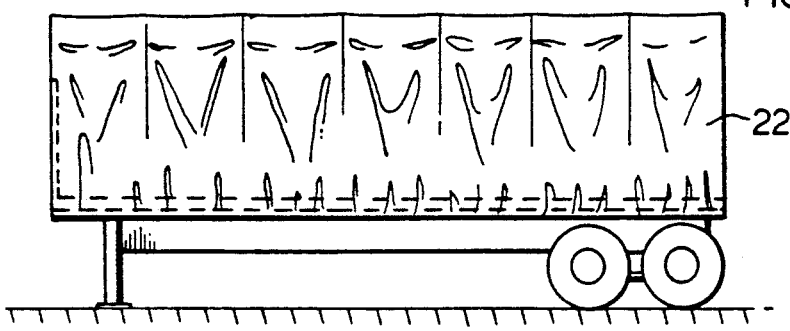
FIGS. 12, 13, 14, 15 and 16 are schematic side views of the first embodiment of FIG. 1 varying only in respect in the manner in which the tarp may be collapsed.
Figure 13:
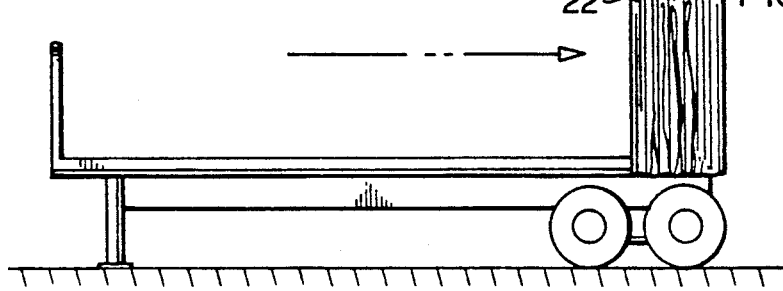
Figure 14:
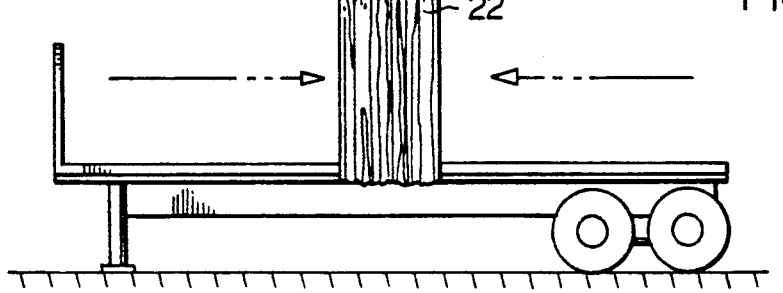
Figure 15:
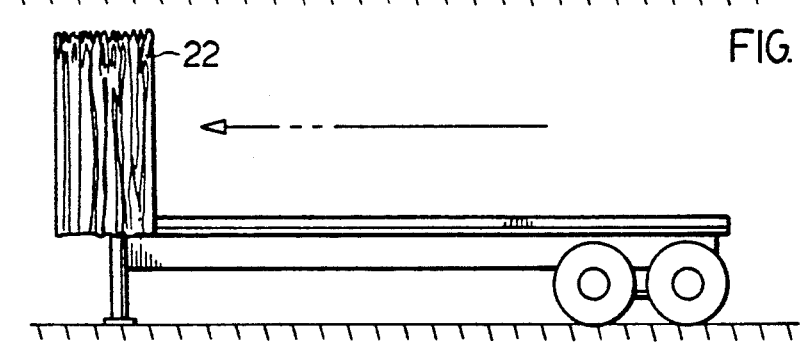

In the discussion of the embodiment of FIGS. 1 and 2, cable strands 40 and 44 have been indicated as fastened to rearmost bow 24a with the forwardmost bow 24b secured near the front of the trailer. FIGS. 12 and 13 illustrate another configuration in which the cable strands 40 and 44 are secured to the forwardmost bow and the cover 22 collapses towards the rear. FIG. 14 illustrates another configuration in which a central bow may be secured to the trailer, forwardmost bow 24b to cable strands 38 and 42 and rearmost bow 24a to cable strands 40 and 42.

Figure 11:
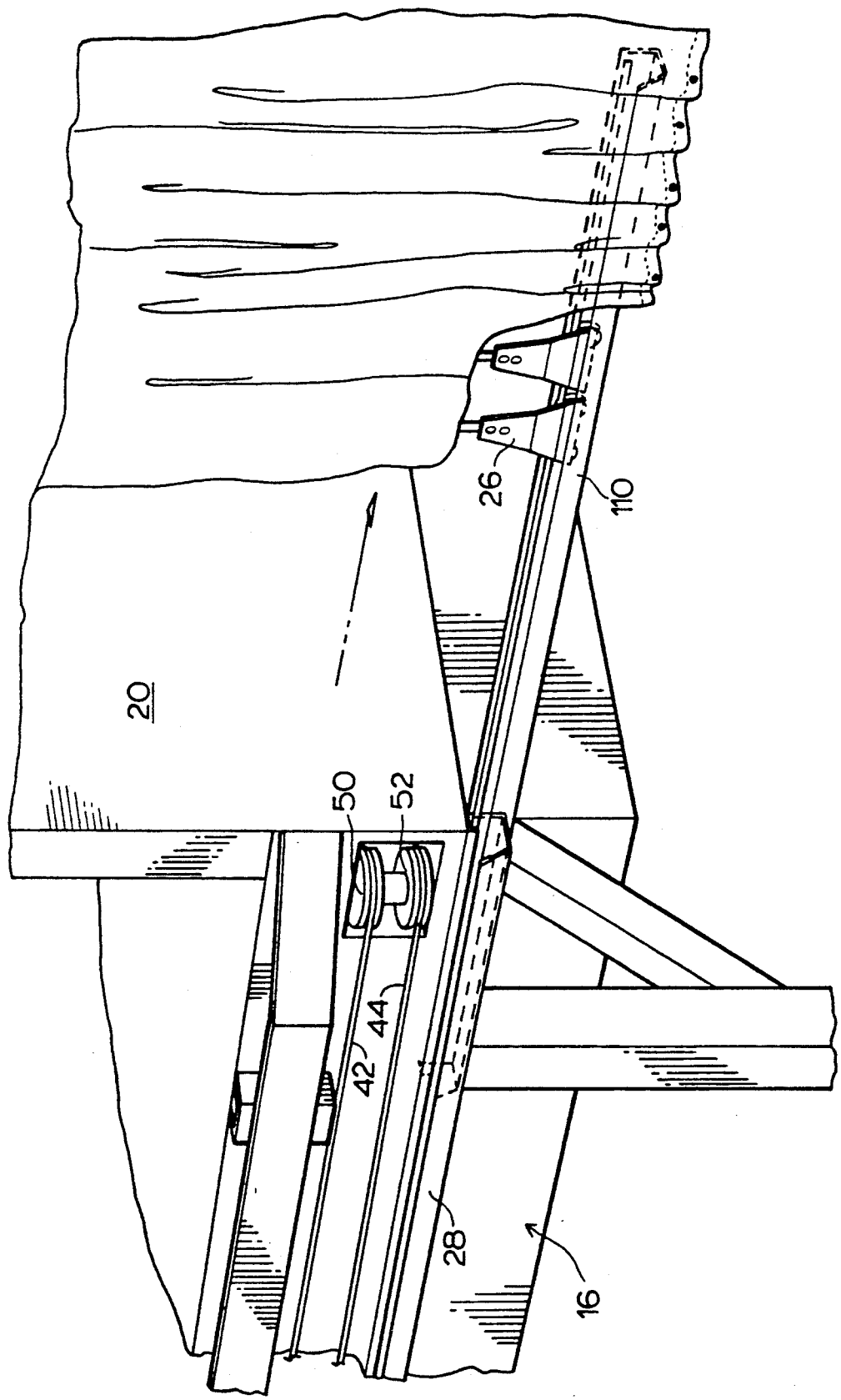
FIG. 11 is a partial pictorial view of a front end of the first embodiment of FIG. 1 with a removable track exterior shown attached.
Figure 16:
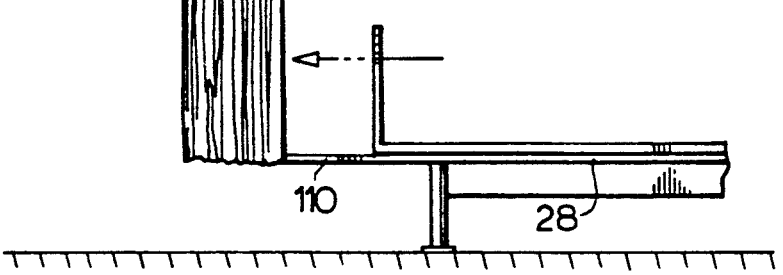

Reference is now made to FIGS. 11 and 16 illustrating the use of a track extension 110. Extension 110 is removably secured to the trailer so as to form an extension of the track onto which all the mounting members can be rolled. This permits full lateral access to the trailer which may be of assistance in some loading situations. As well, once all the mounting members are rolled onto the extensions 110, the entire tarp system may then be conveniently removed from the trailer maintained on the extension by mere disengagement of the extensions from the trailer. The two extensions 110 may be joined together to provide a structural unit to support the tarp system if total removal from the trailer is desired.

Extensions 110 are shown telescopically received in track 28 as one simple method of attachment. Extension 110 may have a similar profile to that of track 28.

Figure 5:
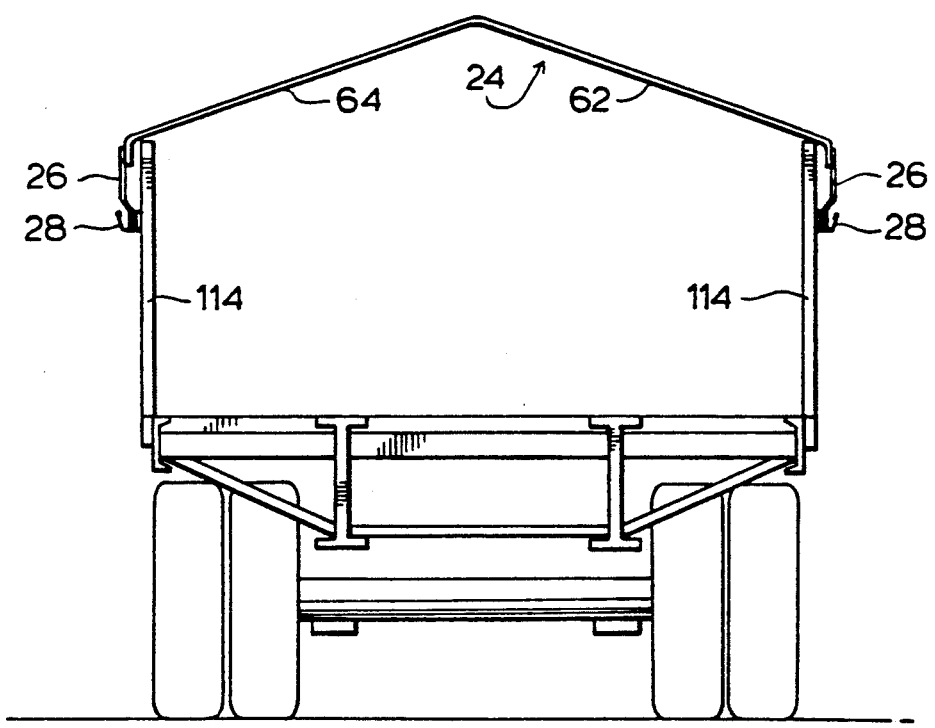
FIG. 5 is a schematic rear view similar to FIG. 4 but of a trailer with permanent rigid sides.

FIG. 5 shows a truck trailer with permanent rigid side walls 114 in which bows 24 have shortened legs and tracks 28 and 30 are mounted near the top of side walls 114 to carry similar mounting members 26.

Figure 9:
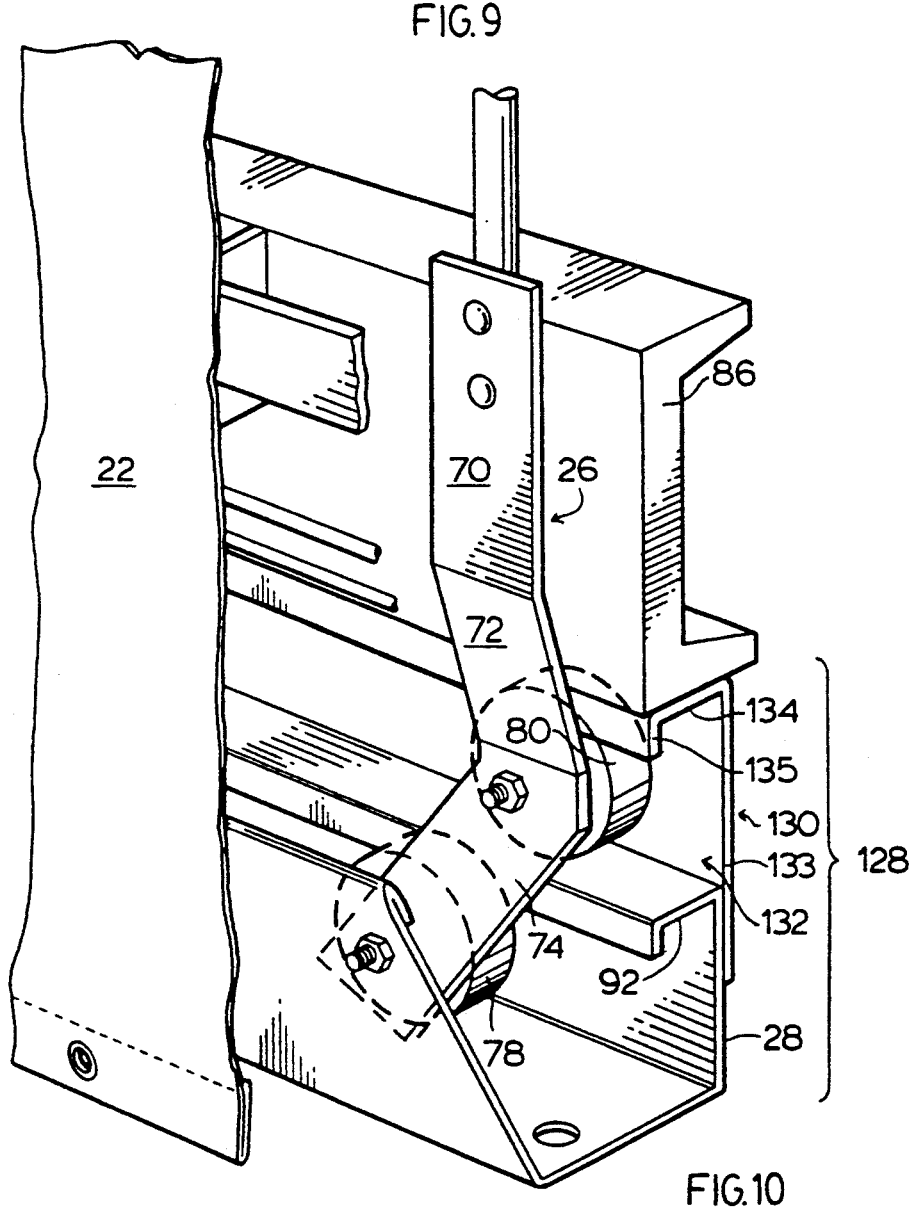
FIGS. 9 and 10 are views similar to FIGS. 7 and 8 but of mounting members and a double track system in accordance with a second embodiment of the present invention.
Figure 10:
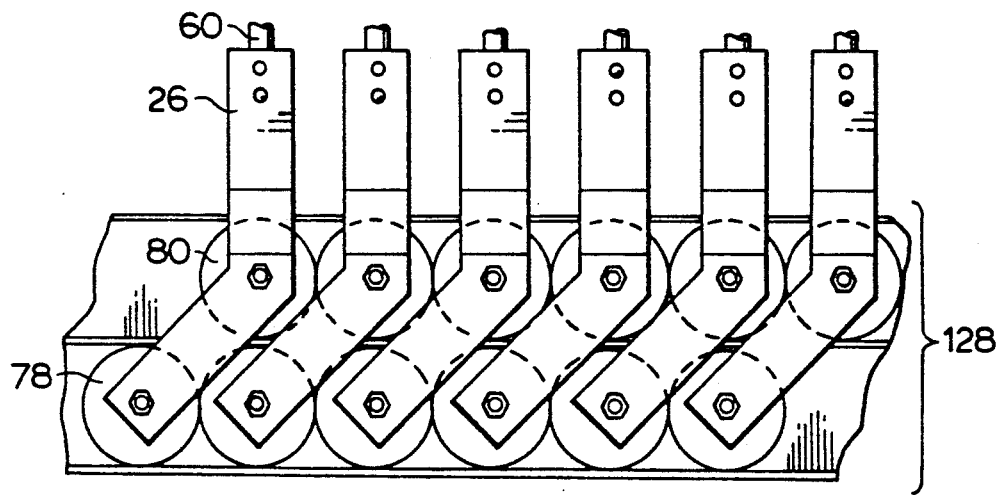

Reference is now made to FIGS. 9 and 10 showing a second embodiment of the invention. For FIGS. 9 and 10, the same reference numerals are used to refer to similar elements in FIGS. 1 to 8. In FIGS. 9 and 10, the single track 28 of the first embodiment is replaced by a double trackway 128 formed by a lower track 28 identical to that of the first embodiment but secured to beam 86 by an inverted J-shaped member 130. As seen, a second upper track 132 is formed between the top portion 92 of track 28 and side wall 133, top portion 134 and retaining wall portion 135 of member 130. Mounting member 26 carries rear wheel 80 above front wheel 78 with the rear wheel 80 to be received in upper track 132 and the front wheel 72 to be received in lower track 28. As seen in FIG. 10, this provides stability to bows 24 by having the two wheels spaced, yet provides for nesting of the mounting members 26 when the cover 22 is collapsed so that the nested mounting members 26 take up a smaller length on the track.

Figure 17:
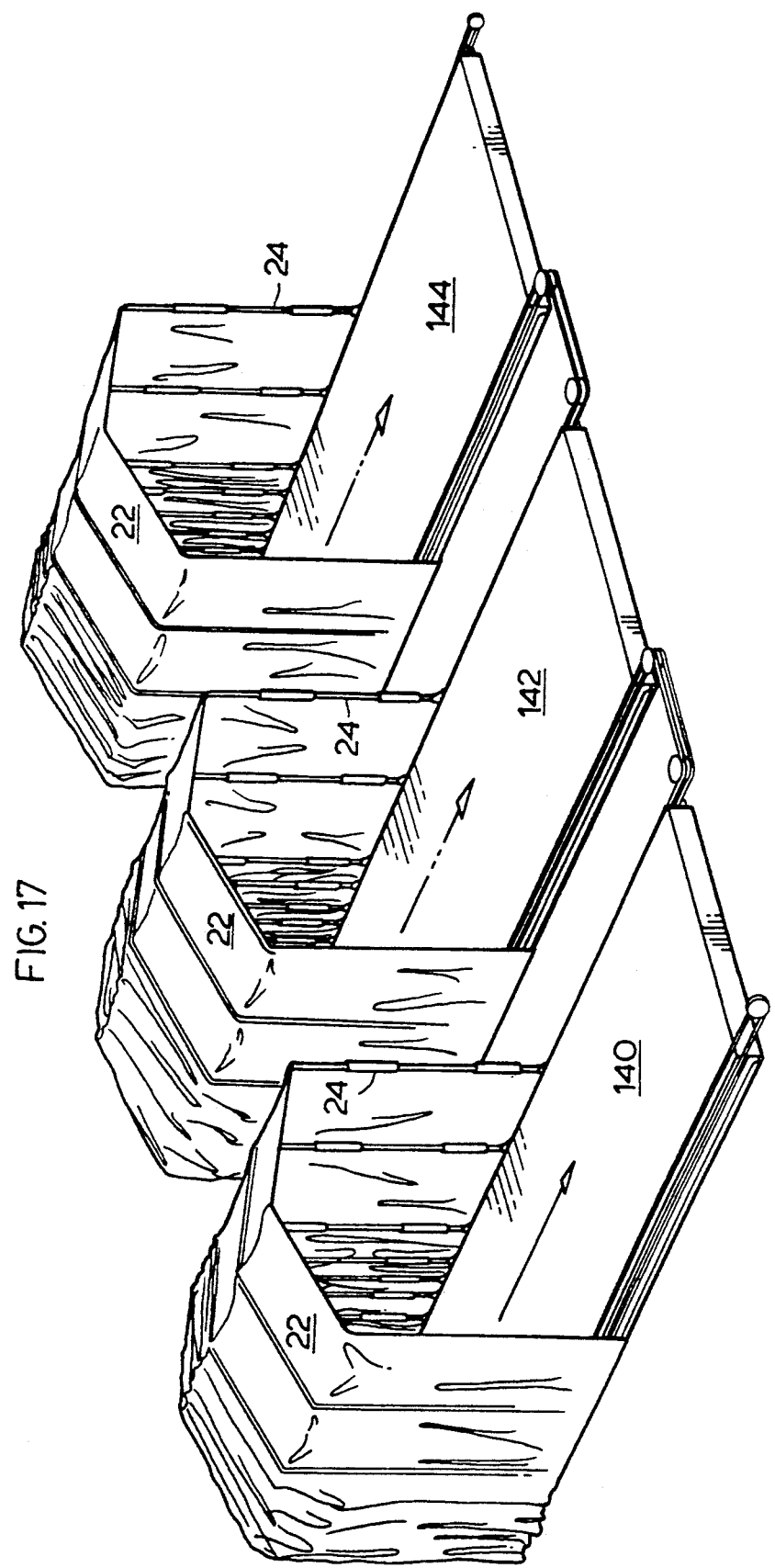
FIG. 17 is a pictorial view of three concrete beds having removable tarps in accordance with a third embodiment of this invention.

Reference is now made to FIG. 17 schematically showing a third embodiment of the present invention. In FIG. 17, a bed or pad, such as concrete pads 140, 142 and 144 are each provided with the retractable cover system as shown in FIG. 1 with a tarp 22 supported on bows 24 carried by mounting members supported on tracks 28 disposed along each side of each pad. The cover system provides a simple and efficient system for enclosing the pads. Such pads may have many uses, for example, as pads to store vehicles, equipment, supplies and the like or as to form an enclosure in which work can be performed away from weather and secured to retain heat. One preferred use is as retractable covers for casting beds to support moulds for concrete castings. The cover can easily be closed after pouring the concrete to keep of rain and retain heat, and opened for removal.

FIG. 17 also shows a single interconnecting closed loop cable system for all three beds whereby opening of one bed may open all the others.

Figure 18:
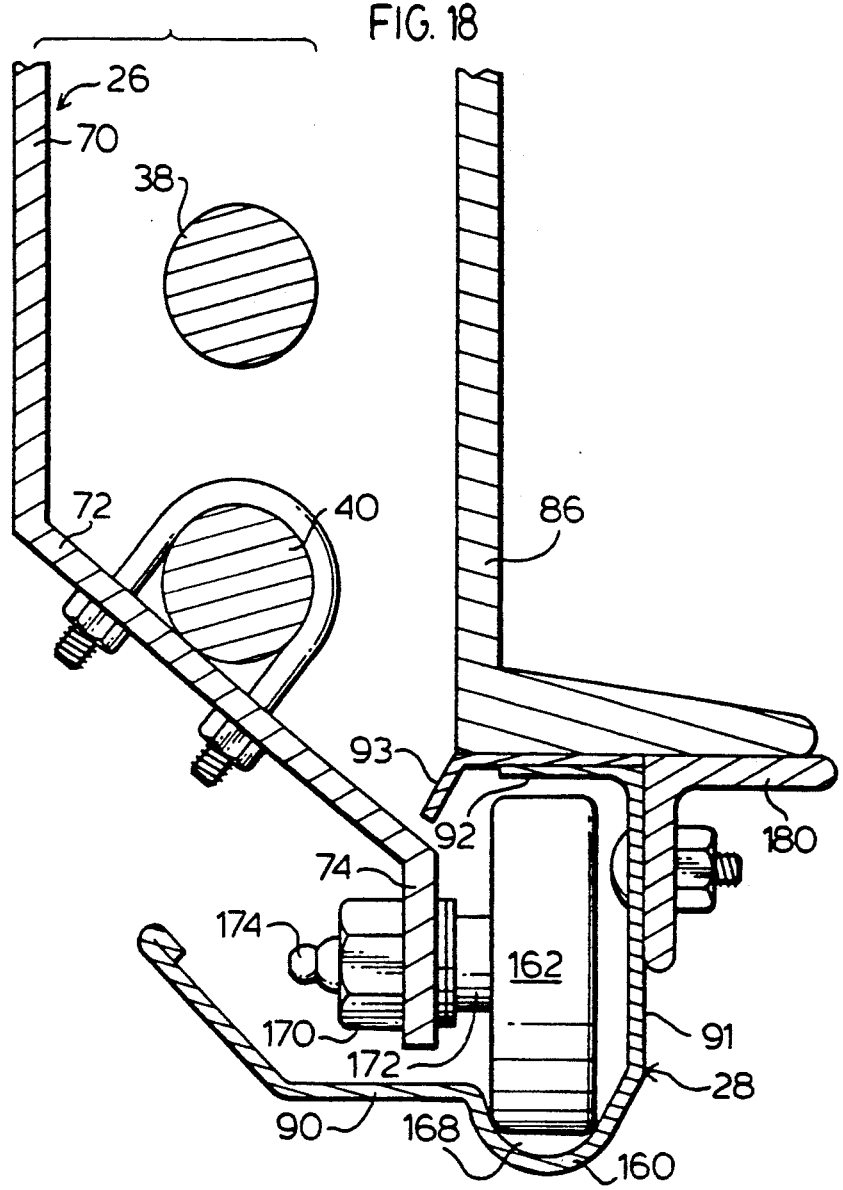
FIG. 18 is an enlarged cross-sectional rear view similar to FIG. 6 but showing a modified form of the track.
Figure 19:
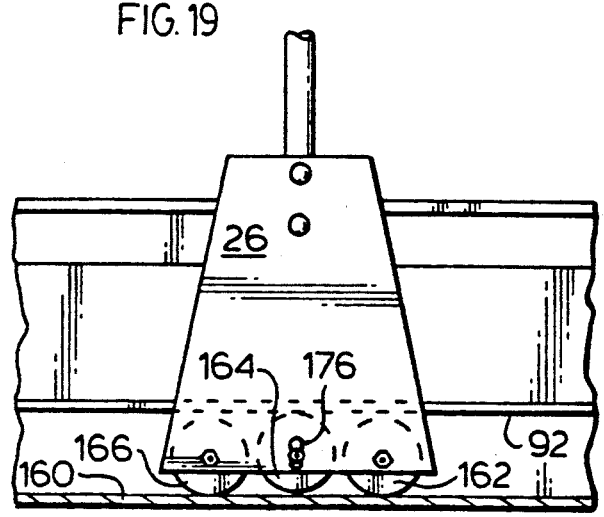
FIG. 19 is a partial side view similar to FIG. 8 of the mounting member and track of FIG. 18.

FIGS. 18 and 19 show another form for the track and mounting member. Similar reference numerals are used in FIGS. 18 and 19 to those in the other figures to indicate equivalent elements.

In FIG. 18, track 28 is modified so as to provide base portion 90 with a concave, downwardly extending curved wheel engaging groove 160. Groove 160 serves the purpose of retaining the wheels 162 and 166 in a desired longitudinal path of travel, particularly when a generally square-ended wheel 162 is used as seen in FIG. 18. Wheel 162 is preferably of hard rubber-like material, and may have some resiliency to conform to the side surfaces of the groove.

In FIG. 18, the groove 160 has inwardly angled side surfaces which engage bottom surfaces of the wheel 162 on opposite sides thereof so as to guide the wheel 162 longitudinally in the track. The groove 160 also provides a space 168 below the wheel which can accommodate dirt, snow and the like without impairing operations.

FIG. 18 shows the wheel 162 as bolted to vertical portion 74 of member 26 by nut 170 and with axle 172 for the wheel having a grease nipple 174.

Track 28 is shown as formed with retaining wall portion 93 extending downwardly from the outer edge of top portion 92 spaced from the wheel so as to keep the wheels in the track only if the wheels become substantially out of the groove 160 and do not otherwise contact the wheels.

FIG. 19 shows mounting member 26 carrying three wheels 162, 164 and 166. Lower surfaces of outer bottom wheels 162 and 166 engage the upper surfaces of groove 160. The upper surfaces of wheels 162 and 166 are spaced from and do not engage top portion 92. The upper surfaces of middle top wheel 164 engage the lower surfaces of top portion 92. The lower surfaces of wheel 164 are spaced from and do not engage groove 160. Vertical portion 74 of member 26 has a vertical slot 176 for mounting of middle wheel 164 to permit the vertical height of the middle wheel 164 to be adjusted. With the track and wheel configuration of FIGS. 18 and 19 substantially improved, rolling and alignment has been experienced.

FIG. 18 also shows a simplified construction for the track with angle iron 180 secured to U-beam 86 and track portions 90, 91 and 92 bolted to angle iron 180 with track portion 93 formed from a separate sheet of metal.

Figure 20:
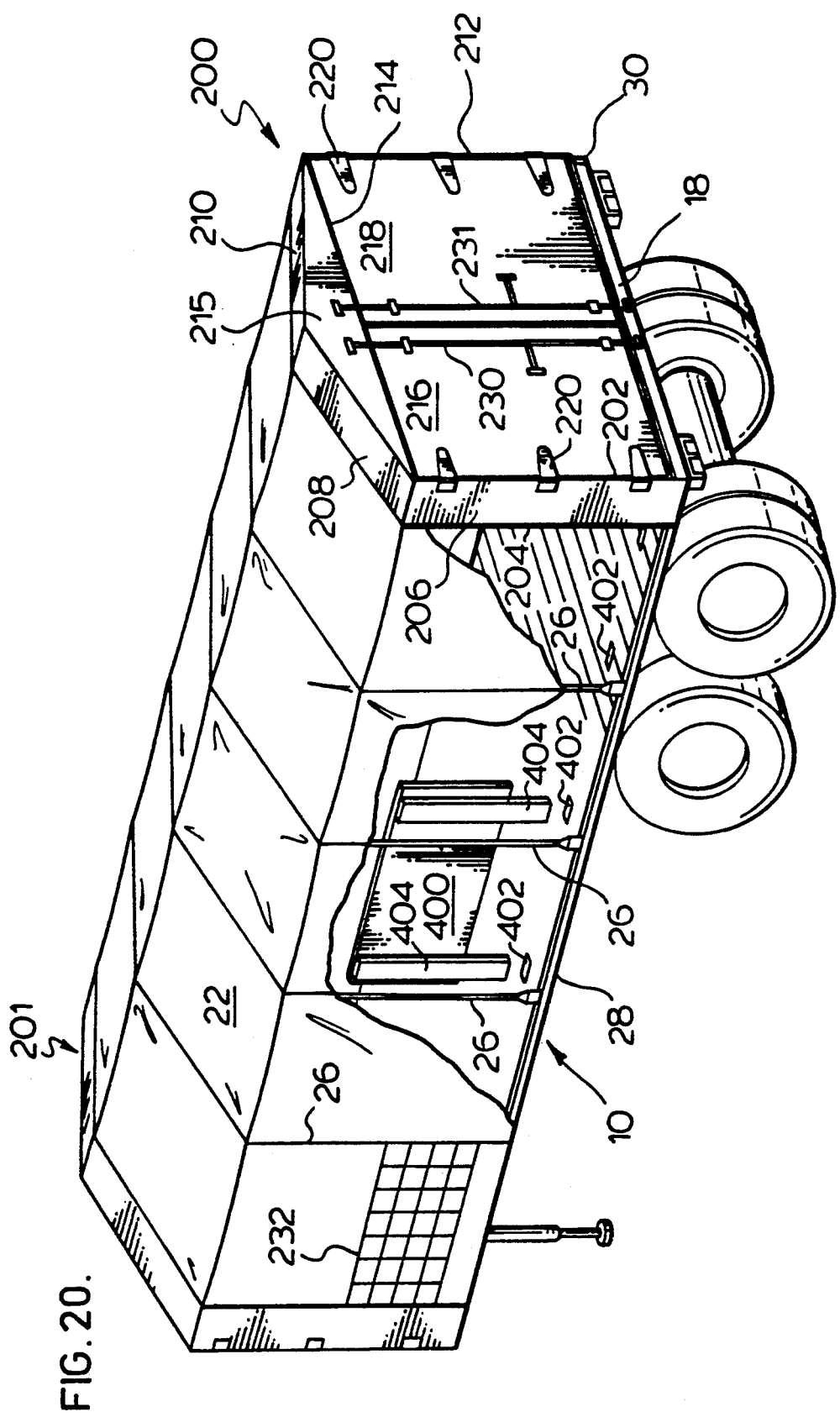
FIG. 20 is a pictorial view of a fourth embodiment of the present invention showing the tarp in a fully covered position.

Reference is now made to FIGS. 20 to 23 showing a fourth embodiment of the present invention which operates substantially the same as with the first and second embodiments but incorporates a construction providing end doors. As with the first and second embodiments, trailer 10 has a number of mounting bows 26 received in parallel tracks 28 and 30 mounted under each side of the bed so that the bows may be moved forwardly and rearwardly guided by the tracks in the manner of the first and second embodiments. At the rear end, a rear door support member 200 is provided. At the front end, a similar front door support member 201 is provided. Each end door support member 200 and 201 comprises two simple bows 202 and 204 joined together to form a rigid bow-like truss. The two bows 202 and 204 are joined by panels 206, 208, 210 and 212 of sheet metal. As well, a tubular cross-brace 214 is provided across the top of bow 202 and a panel 215 of sheet metal closes the triangular apex between cross-brace 214 and bow 202. Two doors 216 and 218 are secured by hinges 220 to the sides of door support member 200 so as to be pivotable from a closed position as shown in FIG. 20 to an open position in which the doors lie alongside the sides of the flat bed 10 as seen, for example, in FIG. 22.

The door support members 200 and 201 may either be secured to the trailer bed 10 against movement or be adapted to be forwardly and rearwardly slidable in tracks 28 and 30. When slidable in tracks 28 and 30, the support members may be either secured to cable strands 40 and 44 for movement with the cable strands or unsecured to the cable strands and optionally releasably locked by a locking mechanism to the bed.

Whether or not movable, the door support members preferably form a rigid truss-like member bridging the bed from one track to the other and providing sufficient support for the doors for movement of the doors between open and closed positions without substantial deflection of the support members. The support members 200 and 201 extend over the tracks 28 and 30 a length greater than an individual bow 26. By engaging the tracks at longitudinally spaced locations, for example, as in the manner of two bows 202 and 204 secured together yet spaced, the door support members increase their stability.

A first configuration of the fourth embodiment is shown in FIG. 22, the rear door support member 200 is fixed to the bed 10 against movement and cover 22 is not secured to rear door support member 200 but rather the rear edge of the cover 22 is secured to the rearward most movable bow 26. The rearward most movable bow 26 has been moved rearwardly away from the fixed rear door support member 200 so as to collapse the cover as shown and permit, for example, loading from the side of the bed 10. To ensure a substantially weatherproof seal between the rearward most movable bow 26 and the rear door support member 200, latching and sealing devices such as hook 203 and rubber seals 205, only seen in FIG. 22, may be provided on the fixed rear door member support 200 by which the cover 22 of rearward most movable bow 26 may be latched and sealed to support member 200 in the closed position.

Figure 23:
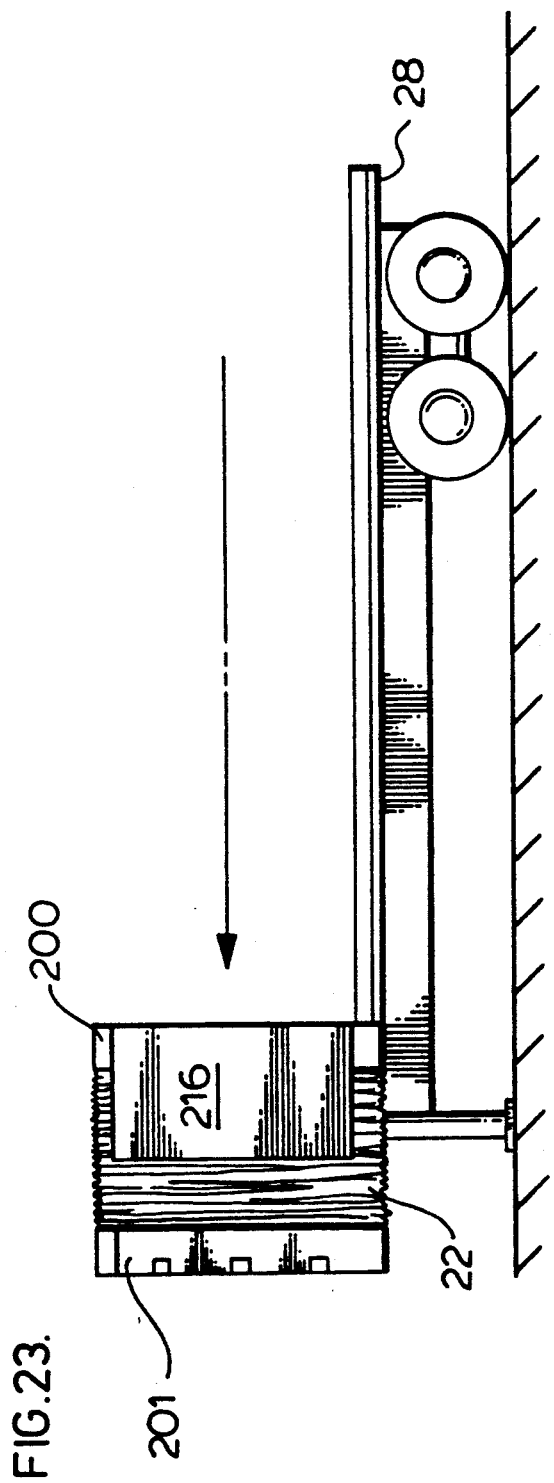
FIG. 23 shows a configuration of the fourth embodiment in which the rear door supporting bow is movable.

A second configuration of the fourth embodiment is shown in FIG. 23. In this second configuration, the rear door support member 200 is received in parallel tracks 28 and 30 for forward and rearward movement in the same manner as the bows 26 and with the cover 22 secured to the rear door support member 200.

In the second configuration of FIG. 23, with doors 216 and 218 open, rear door support member 200 may be moved rearwardly from the fully covered position of FIGS. 20 and 21 to the fully collapsed position of FIG. 23 even if articles are present on the trailer bed 10. In the context of FIG. 23, it is to be appreciated that the rear door support member 200 functions the same as the bows 26 in collapsing the cover and is accurately described as the rearward most movable end bow.

In the second configuration of FIG. 23, it is to be appreciated that rear door support member 200 is secured to cable strands 40 and 44 such that the rear bow 200 is drawn rearwardly. In FIG. 23, the front door support member 201 is preferably locked to trailer bed by suitable locking devices and not secured to cable strands 40 and 44. In other configurations, the front door support members 201 could also be a movable bow.

Providing rear door support member 200 with its doors permits the simple flat bed trailer to be used either as a simple flat bed trailer or as a covered trailer. For example, the trailer may be used as a normal covered trailer merely by opening the rear doors, for example, for loading of small boxed goods in poor weather through the rear doors. The trailer can also be loaded from the side with the cover collapsed for loading in difficult situations or of large items.

The cover 22, bows 26, door support members 200 and 201 and the doors can be configured to ensure that all goods are protected from weather during transit.

The door support members 200 and 201 provide support for the doors which preferably are rigid panels in the manner of conventional doors to facilitate opening and closing and to enhance security. Latching and locking devices generally indicated 230 and 231 are provided to secure the doors closed in known manner. With the cover 22 stretched to the covered position of FIG. 21 and the door support members 200 and 201 having their doors locked together and to the truck bed 10, entry to the closed trailer is prevented and any entry as by cutting through cover 22 will be readily apparent. By incorporating a wire netting into cover 22, indicated schematically as 232 in one section of FIG. 20, at least over the lowermost portion of the cover, can further hinder unauthorized entry.

FIGS. 20 to 23 show both front and rear door support members 200 and 201, however, it is to be appreciated that only one may be provided.

FIG. 20 schematically shows how the system of the present invention can permit sides to be provided on the flat bed trailer in a conventional manner without interference with operation of the retractable cover. Bed 10 includes spaced holes 402 or ports to receive vertical uprights 404 of rigid side panels 400 and thus secure the side panels 400 to the bed in known manner. Bows 26 are outside the panels 400 and do not interfere. Preferably, panels 400 may be configured to fit between bows 26.

Figure 24:
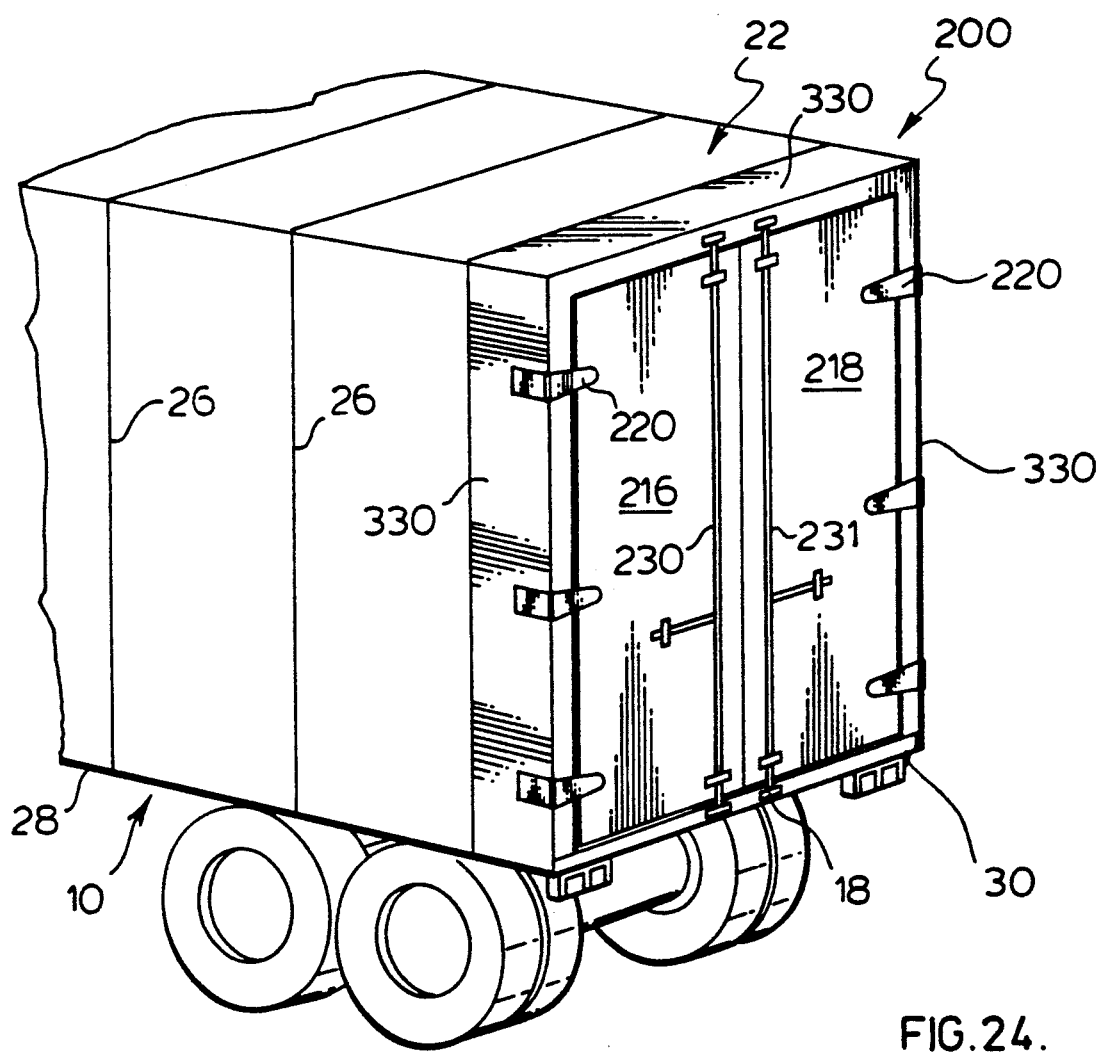
FIG. 24 shows a pictorial view of a fifth embodiment similar to the fourth embodiment.

Reference is made to FIG. 24 which shows a pictorial view of a fifth embodiment of a trailer similar to the fourth embodiment but notably having rectangular bows 26 so as to maximize the volume of the trailer as in the manner of a box van to take full advantage of the legal height of trailers. In FIG. 24, similar reference numerals are used to indicate similar elements to those in other embodiments. As with the fourth embodiment, the bows 26 are movable in tracks 28 and 30 while the rear door support member 200 may be permanently fixed or temporarily fixed and/or movable.

Figure 25:
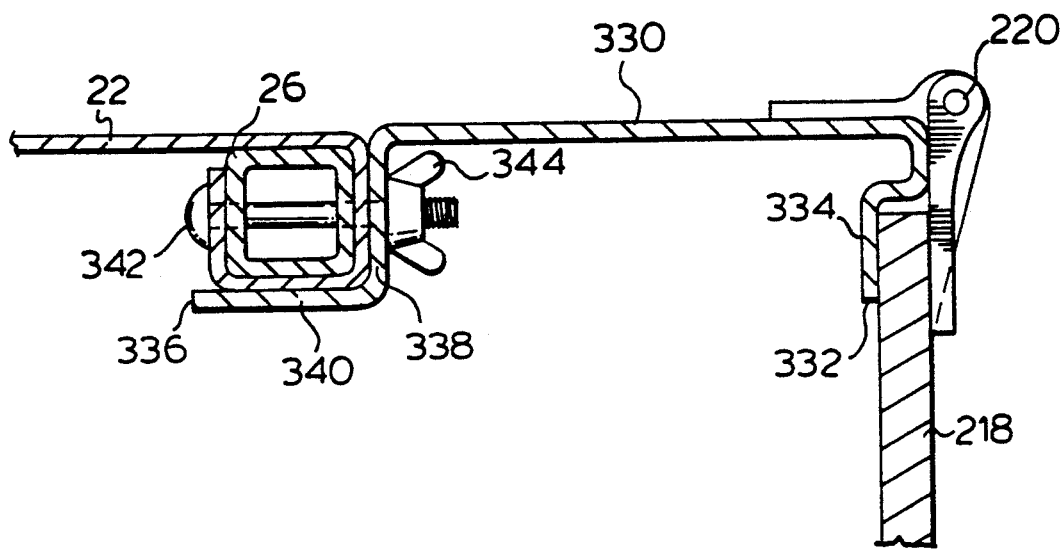
FIGS. 25 and 26 show two arrangements for securing a rearward most bow to the rear door support member in the fifth embodiment.
Figure 26:
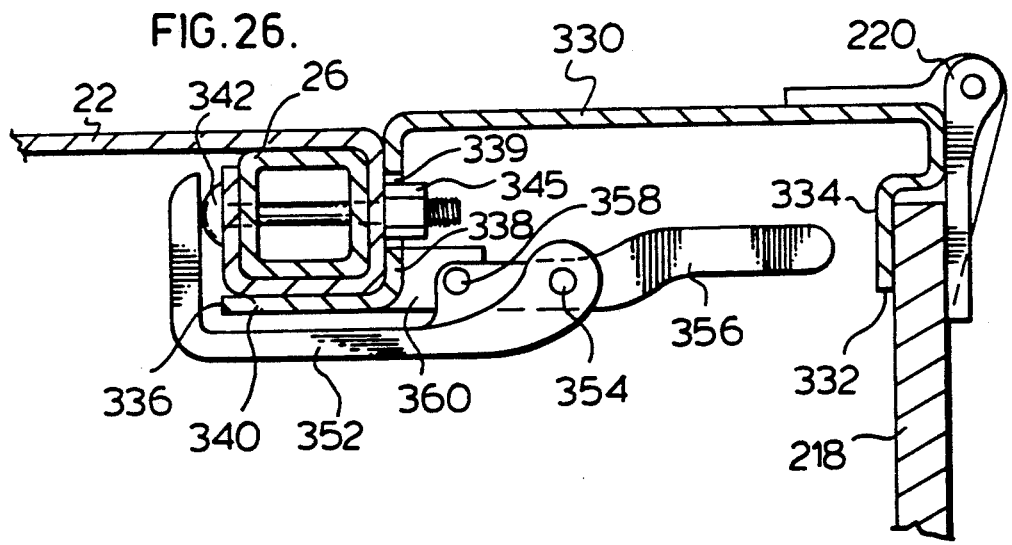

FIGS. 25 and 26 show cross-sectional plan views looking down on the right-hand side member of support member 200. In each case, support member 200 comprises an extruded aluminum or bent metal element 330. In both FIGS. 25 and 26, a rear end 332 of element 330 is bent so as to receive hinge 220 to which rigid door 218 is secured, with the door to seal against end flange 334 of element 330.

At the front end 336, the element 330 has a perpendicular shoulder 338 and a parallel end flange 340. With the cover 22 wrapped about the rearward most bow 26, the bow is secured in sealed relation to element 330 via bolts 342 passing through holes in cover 22, bow 26 and shoulder 338 to wing nut 344. In this manner, bow 26 may be secured more or less permanently.

FIG. 26 shows the same configuration as in FIG. 25 but with a clamp provided for quick release, which is useful when the support member 200 is not movable. In FIG. 26, the shoulder 338 has an enlarged hole 339 so as to permit bolt 342 and its nut 345 to pass without engagement.

A clamp device 350 has an L-shaped arm 352 to engage the end of bolt 342 and urge the bow 26 into sealing engagement with shoulder 338 and flange 340. Arm 352 pivots about pin 354 on lever 356 itself pivoted about pin 358 secured via boss 360 to element 330 in known manner.

Many advantages of the present invention will be apparent to persons skilled in the art. For example, the bows illustrated may be easily fabricated from steel. The tarp system of FIG. 1 can easily be opened or closed by one person from either side with the person on the ground not having the need to climb on the trailer. The location of the track in FIG. 6 under the trailer protects it against damage in collisions and loading. The track may be made in inexpensive sections for replacement if damaged.

While the invention has been described with reference to preferred embodiments, it is not so limited. Many modifications and variations will now occur to those skilled in the art. For a definition of the invention, reference is made to the appended claims.

We claim:

1. A retractable tarp enclosing system for covering a bed of trucks and trailers and the like comprising:
   two elongate track means, one on each side of the bed,
   a plurality of U-shaped bow means, each having two legs connected by a central bight, and guide means at each end of the legs,
   each bow means bridging the bed from one track means to the other with guide means retainably received in the track means on each side of the bed for movement longitudinally in the track means,
   flexible cover means secured at one end to a rearward most one of said bow means and secured to successive bows means at spaced intervals along the cover means, whereby moving the rearward most bow means along the track collapses or expands the cover means in an accordian-like fashion,
   the rearward most bow means carrying door means comprising two rigid panels, one hinged to each of the legs of the rearward most bow means for pivoting about a generally vertical axis between a closed portion in which the door means close the end of the bed and an open position in which the door means lie along the sides of the bed so as to not interfere with longitudinal movement of the rearward most bow means in the tracks in collapsing or expanding the cover means.

2. A system as claimed in claim 1 wherein said rearward most bow means comprise a rigid truss-like member bridging the bed from one track means to the other providing sufficient support for the door means for movement of the door means between open and closed positions without substantial deflection of the rearward most bow means.

3. A system as claimed in claim 2 including door latch means to releasably secure the door means together in the closed position.

4. A system as claimed in claim 3 including door latch means to releasably secure the door means to the bed in the closed position.

5. A system as claimed in claim 2 wherein said rearward most bow means engages said track means at longitudinally spaced location.

6. A system as claimed in claim 1 including a cable positioning system for moving and positioning the bow means comprising:
   a closed loop of cable; the cable having two looped ends, each looped about single pulley wheel means near the ends of the track means at one end of the bed and extending as double parallel strands along the track means on each side of the bed to double pulley means which direct the two strands across the width of the bed,
   wherein on drawing the cable about its loop, a first of the strands on each side moves in the same longitudinal direction relative to the tracks,
   the rearward most bow having its guide means coupled to said first strand on each side of the bed, whereby moving the cable about its loop draws the first bow along the track and collapses or expands the cover means.

7. A tarp enclosing system as claimed in claim 6 wherein successive bows are secured to the cover means at spaced intervals between the first and last bows.

8. A tarp enclosing system as claimed in claim 7 wherein the guide means comprise wheel means for rolling engagement in the track means.

9. A tarp enclosing system as claimed in claim 8 wherein each guide means has two wheels spaced longitudinally from each other received in the track means constrained against substantial movement laterally.

10. A tarp enclosing system as claimed in claim 9 when used on a flat bed trailer wherein the track means and cable positioning system are disposed underneath the side edges of the bed, substantially laterally inward therefrom.

11. A tarp enclosing system as claimed in claim 10 wherein the guide means passes upwardly past laterally outermost side edges of the bed as a thin planar bracket member to minimize the extent the system increases the lateral width of the bed.

12. A tarp enclosing system as claimed in claim 8 wherein each guide means has at least two bottom wheels spaced longitudinally from each other received in the track means,
   the track means having a bottom guide surface with a downwardly extending longitudinal groove with inwardly angled side surfaces,
   the angled side surfaces of the groove engaging bottom surfaces of each of the two bottom wheels on each side thereof to guide the bottom wheels longitudinally in the track.

13. A tarp enclosing system as claimed in claim 12 wherein the two bottom wheels engage the groove such that a space is formed in the groove under the bottom surfaces of the two bottom wheels in which dirt may collect without impeding or rolling of the wheels.

14. A tarp enclosing system as claimed in claim 12 wherein each guide means further includes a third top wheel whose upper surfaces engage a top guide portion of the track, spaced upwardly above the groove.

15. A retractable tarp enclosing system for covering a bed of trucks and trailers and the like comprising:
   two elongate track means, one on each side of the bed,
   a plurality of U-shaped bow means, each having two legs connected by a central bight, and guide means at each end of the legs,
   each bow means bridging the bed from one track means to the other with guide means retainably received in the track means on each side of the bed for movement longitudinally in the track means,
   flexible cover means secured at one end to a rearward most one of said bow means and secured to successive bows means at spaced intervals along the cover means, whereby moving the rearward most bow means along the track collapses or expands the cover means in an accordian-like fashion,
   a bow-like door support member fixed to the bed to bridge the bed from one side to the other at the rear of the bed rearward of the rearward most bow means,
   door means carried by the door support member for movement between an open position and a closed position to open and close the end of the bed,
   means for releasably coupling in substantially weather sealed relation the rearward most bow means to the door support means.

16. A system as claimed in claim 15 including a cable positioning system for moving and positioning the bow means comprising:
   a closed loop of cable; the cable having two looped ends, each looped about single pulley wheel means near the ends of the track means at one end of the bed and extending as double parallel strands along the track means on each side of the bed to double pulley means which direct the two strands across the width of the bed,
   wherein on drawing the cable about its loop, a first of the strands on each side moves in the same longitudinal direction relative to the tracks,
   the rearward most bow having its guide means coupled to said first strand on each side of the bed, whereby moving the cable about its loop draws the first bow along the track and collapses or expands the cover means.

* * * * *